US006129197A

United States Patent [19]

Gore

[11] Patent Number: 6,129,197

[45] Date of Patent: Oct. 10, 2000

[54] ESCALATOR GUARD

[75] Inventor: Nicholas Gore, Bristol, United Kingdom

[73] Assignee: Kleeneze Sealtech Limited, United Kingdom

[21] Appl. No.: 08/880,004

[22] Filed: Jun. 20, 1997

[51] Int. Cl.[7] .......... B65G 43/00

[52] U.S. Cl. .......... 198/323; 198/326

[58] Field of Search .......... 198/321, 323, 198/326, 335

[56] References Cited

U.S. PATENT DOCUMENTS

| | | | |
|---|---|---|---|
| 3,986,595 | 10/1976 | Asano et al. | 198/333 |
| 5,810,147 | 9/1998 | Vanmoor | 198/323 |

OTHER PUBLICATIONS

FEHR, "Metro Using Brushes on Escalator Gap Problem", Washington Post, Sep. 9, 1994 p. B3, Class 198 Subclass 326.

*Primary Examiner*—Joseph E. Valenza

*Attorney, Agent, or Firm*—MacMillan, Sobanski & Todd, LLC

[57] ABSTRACT

A guard element having a deflector (8, 10) for covering the gap between an escalator step (48) and an escalator side wall (46). The guard element comprises an elongate body portion (2) which supports the deflector (8, 10) and an elongate mounting portion (24, 28, 30, 38) which is adapted to abut the escalator side wall (46). The body portion (2) is provided with a formation (18, 20) which interengages with a corresponding formation (22, 36) provided on the mounting portion (24, 28, 30, 38).

In a preferred embodiment, the formation on the mounting portion (24, 28, 30, 38) comprises a T-shaped rib (22, 36) and the formation on the body portion (2) comprises a T-shaped recess (18, 20, 26).

14 Claims, 4 Drawing Sheets

ESCALATOR GUARD

BACKGROUND OF THE INVENTION

This invention relates to a guard element for guarding the gap between the sides of the steps of an escalator and the side wall of the escalator.

It is well known that the gap between the side wall of an escalator and an escalator step presents a risk of entrapment and is potentially dangerous to people using the escalator. Furthermore, if foreign objects fall into the gap they may obstruct the mechanism or may present a fire hazard. It is therefore important that the gap is guarded (i.e at least partially covered) in use. To overcome these problems, it is known to use brush safety strips fixed to the sides of the escalator at a position just above the upper surface of the steps (the step nose line) to cover the gap and thereby to prevent objects from being trapped in or falling through the gap.

As not all escalator side wall designs are the same or provide sufficient flat surface on the skirting panel to fit escalator safety strips, it is often necessary to "step over" a side wall feature. The problem areas are at the top and bottom transition radii because, in order to maintain recommended clearances above the step nose line, the safety strip does not follow the line of the side wall feature. At these points the safety strip steps away from the feature and back on to the skirting panel. The fitter is then involved in some degree of cutting, filling or machining in order that the safety strip is fitted correctly with no visible gaps.

SUMMARY OF THE INVENTION

According to the present invention there is provided a guard element having a deflector for guarding the gap between an escalator step and an escalator side wall, the guarding element comprising an elongate body portion which supports the deflector and an elongate mounting portion which is adapted to contact the escalator side wall, the body portion being provided with a formation which interengages with a corresponding formation provided on the mounting portion.

Preferably, one formation comprises a continuous recess and the other formation comprises a continuous rib. The rib is preferably barbed and the recess comprises a slot which narrows towards its mouth. Most preferably, the rib and the recess are substantially T-shaped in cross-section.

Preferably at least two formations are provided on the body portion and/or the mounting portion. The formations preferably extend in parallel and at spaced apart locations along the body portion and/or the mounting portion. If there are a plurality of surface formations on the body portion and/or on the mounting portion, preferably, one of the surface formations is higher or deeper than the others.

A plurality of body portions or mounting portions can be interconnected to space the deflector away from the side wall of the escalator. Although only a single deflector could be used, preferably the body portion is provided with a plurality of deflectors located one above the other when the guard element is installed on an escalator. The deflectors preferably comprise lengths of brush strip which may be angled downwardly from the side wall or skirting panel towards the step nose line.

BRIEF DESCRIPTION OF THE DRAWINGS

For a better understanding of the present invention and to show how it may be carried into effect, reference will now be made, by way of example, to the accompanying drawings in which.

DETAILED DESCRIPTION OF THE PREFERRED EMBODIMENTS

Figure 1:
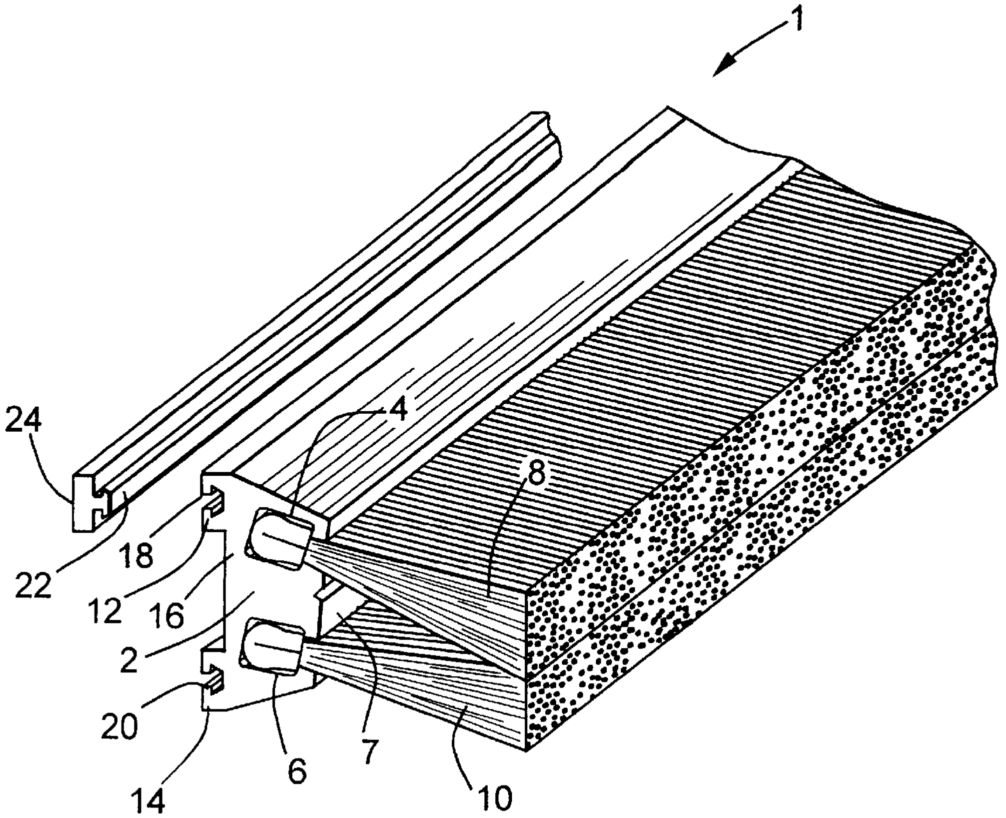
FIG. 1 shows a guard element in accordance with the present invention.

Referring to the drawings, FIG. 1 shows a first embodiment of guard element 1 comprising an elongate body portion 2 of aluminium or plastics material having a pair of elongate slots 4, 6 formed in its front surface 7. Lengths of synthetic brush strip 8, 10 are fixed into the slots 4, 6, by means of a slide fit connection.

Surface formations comprising elongate ribs 12, 14 are integrally formed with the body portion 2 and project from its back surface 16. Each elongate rib 12, 14 is provided with a continuous elongate recess 18, 20 which is substantially T-shaped in cross-section. Each recess 18, 20 is shaped to receive a corresponding surface formation comprising a substantially T-shaped rib 22 formed on an elongate mounting portion 24. The mounting portion 24 is made from aluminium or plastics material.

In accordance with various standard authorities recommendations, the guard element 1 must be installed such that the outer end of the brush strip 10 lies just above the step nose line (NL in FIG. 6) of an escalator. The guard element 1 is held in this position by fixing the back surface 16 of the body portion 2 against or substantially parallel to a side wall panel or skirting panel of the escalator.

In the simplest case, the body portion 2 is fixed directly to the escalator side wall or skirting by means of screws (not shown) driven through the body portion 2 into the side wall or skirting panel. An elongate guide channel 25 is provided on the front surface 7 of the body portion. The channel 25 serves to align the screws or to centre a drill bit used to form screw holes.

Alternatively, as in the arrangement illustrated in FIG. 1, it may be necessary to space the upper edge of the body portion 2 away from the side wall a greater distance than the lower edge of the body portion 2. For example, this may be required where a skirting panel is fixed to an escalator side wall panel and it is necessary to fix the deflector element at the level of the transition between the skirting panel and the side wall panel. In such applications, an elongate mounting portion 24 is fixed to the upper edge of the body portion 2, by pushing the T-shaped rib 22 on the elongate mounting portion 24 into the upper T-shaped recess 18 on the body portion 2.

To facilitate attachment of the elongate mounting portion 24 to the body portion 2, the sides of the T-shaped rib 22 on the mounting portion 24 may be tapered. A corresponding taper may be provided on the side walls of the T-shaped recesses 18 to ensure that the T-shaped rib 22 is a tight fit in the T-shaped recess 18.

Once the mounting portion has been fixed to the body portion 2, the combined assembly can be screwed to the side wall panel and/or skirting panel of the escalator, such that the back surface of the mounting portion 24 rests on the side wall panel and the back surface of the lower rib 14 rests against the skirting panel.

In appropriate situations, it may be desirable to fit respective mounting portions 24 in both the upper and lower ribs 12, 14.

Figure 2:
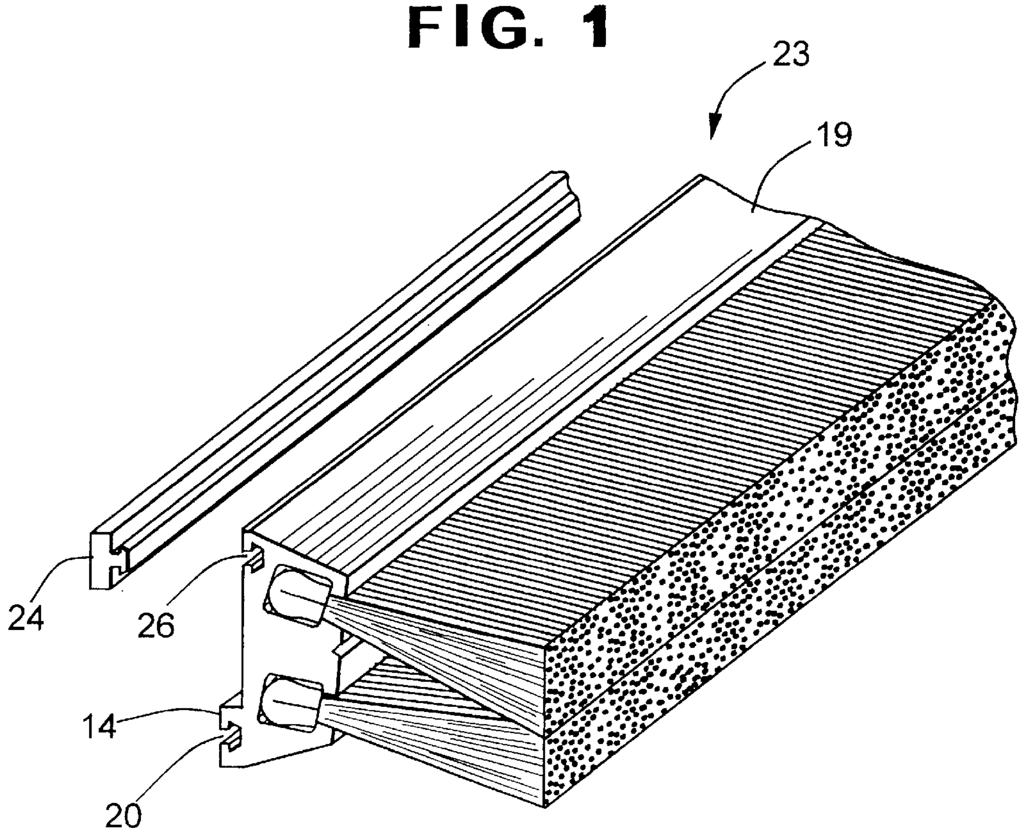
FIG. 2 shows a second embodiment of guard element.

FIG. 2 shows a second embodiment of guard element 23 in which a single elongate rib 14, having a continuous T-shaped recess is provided along the lower edge of a body portion 19. In addition, a second elongate T-shaped recess 26 is formed directly in the inner surface 16 at the upper edge of the body portion 19. The T-shaped recess 26 is identical in size, shape and orientation to the T-shaped recess 20 formed in the rib 14 and can receive mounting portions 24 in the same way.

Figure 3:
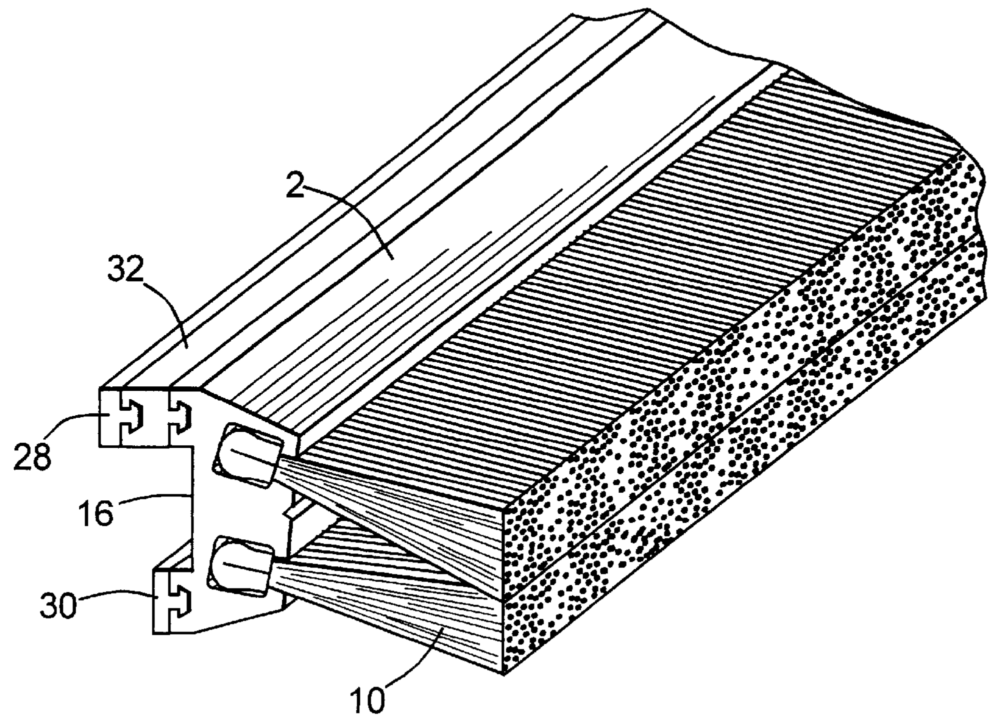
FIG. 3 shows the first embodiment of guard element using a plurality of spacers.
Figure 4:
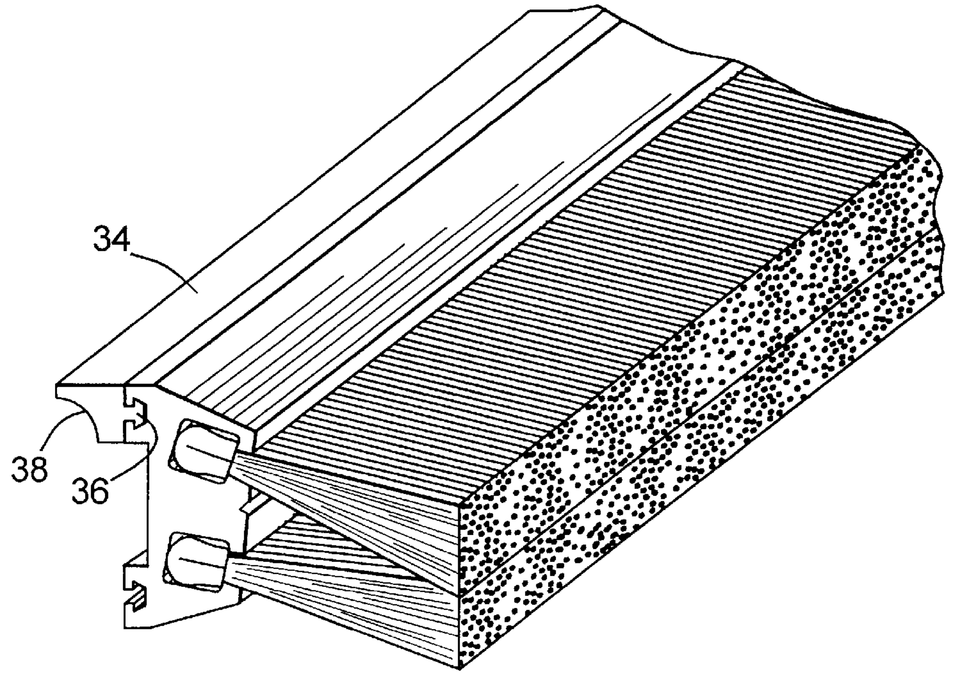
FIG. 4 shows the first embodiment of guard element using a single shaped mounting portion.

Referring to FIG. 3, by selecting mounting portions 28, 30 of different thicknesses, it is possible to space the body portion 2 a desired distance away from the side wall. It is also possible to "step over" side wall features such as skirting panels. In other words, a thinner mounting portion 30 is fixed to the upper rib 12 of the body portion 2 and a thicker mounting portion 28 is fixed to the lower rib 14 of the body portion 2. The body portion 2 is then screwed to the escalator side wall such that the thinner mounting portion 30 contacts the skirting panel and the thicker mounting portion 28 contacts the side wall panel.

In applications in which a very large discontinuity must be overcome, it is also possible to use one or more spacers 32 which have on one side a male surface formation which plugs into a surface formation of the body portion 19 or into an additional spacer 32. On its other side, each spacer 32 has a female surface formation into which a mounting portion 28 or an additional spacer 32 may be plugged.

There are also circumstances in which the side wall or skirting of the escalator does not present a flat mounting surface. In such circumstances a mounting portion 34 having a male surface formation 36 on one side and a shaped surface 38 on the other side may be employed. Mounting portions 34 having a variety of profiles are preferably made available to the fitter, so that the most common discontinuities or surface profiles can be accommodated. For example, the upper edge of skirting is often curved and it would therefore be useful to have a mounting portion 35 having a profile on its inner surface 38 which conforms to the curve on the upper surface of the skirting.

Figure 5:
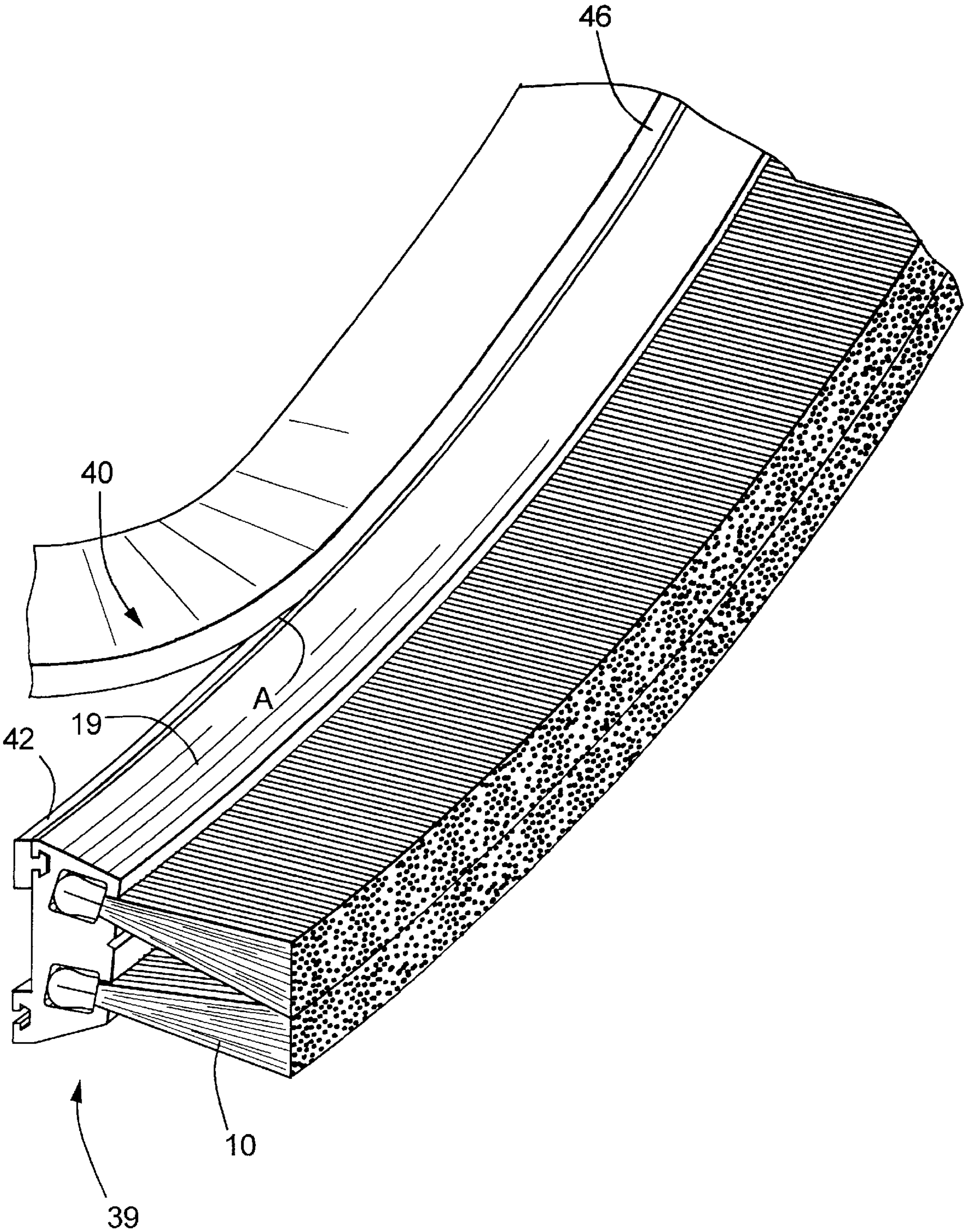
FIG. 5 shows the second embodiment of guard element installed at the bottom transition radius of an escalator.

FIG. 5 shows a guard element 23 installed on an escalator in the region of the bottom transition radius 40. In this application of the second embodiment of the invention, the thickness of the mounting portion 42 is selected so that it equals the depth of the side wall feature. Alternatively, a combination of mounting portions and spacers may be used to make up the gap. As will be appreciated, there is no need to use a mounting portion above the point A in FIG. 5 because, from that point on, the upper edge of the body portion 19 can be fixed directly to the sidewall decking 46. The mounting portion 42 or spacer is therefore cut off at the point A with a saw or sharp knife.

Figure 6:
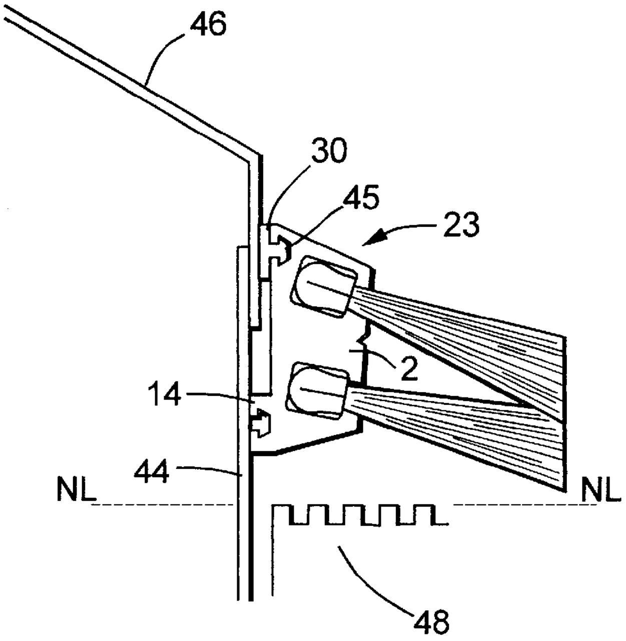
FIG. 6 shows the second embodiment of guard element installed on an escalator incline.

FIG. 6 shows the second embodiment of guard element 23 mounted on an inclined portion of escalator. In this application, the elongate rib 14 of the body portion 19 directly engages the skirting panel 44 of the escalator.

Conventional escalators may have side wall decking 46 which overlaps the skirting panel 44. If the thickness of the side wall decking 46 is less than the thickness of the elongate rib 14 on the body portion 19, the resulting gap can be made up using a thin mounting portion 30. The thin mounting portion 30 is held in place by engagement of a T-shaped rib 45 on the mounting portion 30 in the T-shaped recess 26 formed directly in the body portion 19.

Figure 7:
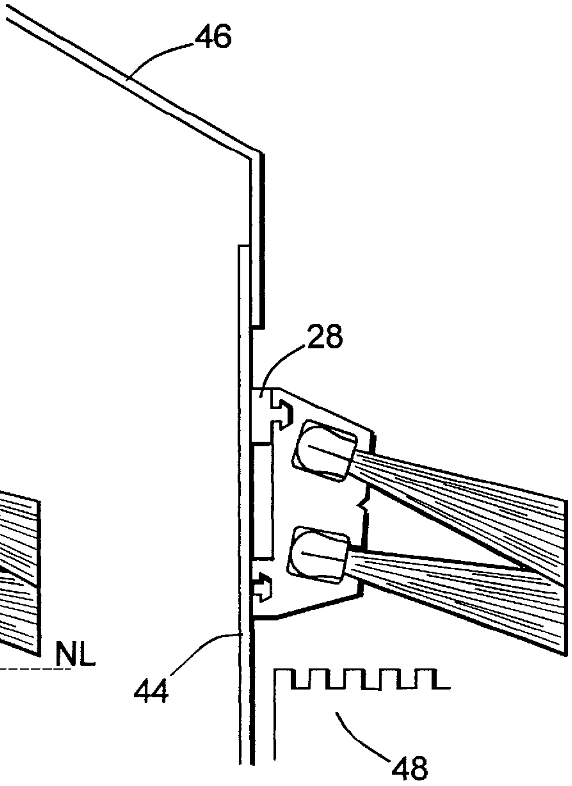
FIG. 7 shows the second embodiment of guard element installed on an escalator landing.

On an escalator having a landing, the arrangement illustrated in FIG. 6 becomes the arrangement illustrated in FIG. 7 in the region of the landing. In other words, on a landing, the side wall decking 46 moves away from the step nose line NL, so the guard element must be mounted entirely on the skirting panel 44. In accordance with the present invention, at the transition to a landing from an incline, the thin mounting portion 30 is replaced by a thicker mounting portion 28. Other discontinuities and peculiar shapings of the escalator can be overcome in a straightforward manner by use of mounting portions and spacers in accordance with the present invention.

It is to be understood that the foregoing embodiments are intended to be illustrative of the invention and that other embodiments are also contemplated. For example, any type or number of deflectors may be used instead of the brush strips 8, 10. Furthermore any number, shape or disposition of surface formations on a body portion and a mounting portion are contemplated and any means of fixing the mounting portions and/or body portion to the side wall of an escalator are also contemplated. The invention may also be applied to the mounting of guard elements on or in the vicinity of other parts of an escalator.

What is claimed is:

1. A guard element for supporting a deflector for guarding a gap between an escalator step and an escalator side wall, said guard element comprising:

a body portion adapted to be secured to the escalator side wall, said body portion including a first surface adapted to support the deflector thereon and a second surface opposite said first surface, said second surface having a body portion mounting formation formed therein; and a mounting portion having a mounting portion mounting formation formed therein, said mounting portion mounting formation cooperating with said body portion mounting formation so as to fix said body portion in position relative to said mounting portion, said mounting portion adapted to be disposed between said body portion and the escalator side wall when said body portion is secured to the escalator side wall.

2. The guard element defined in claim 1 wherein said body portion mounting formation is a recess, and wherein said mounting portion mounting formation is a mounting portion rib that extends within said recess.

3. The guard element defined in claim 1 wherein said second surface of said body portion has a body portion rib formed therein, and wherein said body portion mounting formation is formed in said body portion rib.

4. The guard element defined in claim 3 wherein said body portion mounting formation is a recess formed in said body portion rib, and wherein said mounting portion mounting formation is a mounting portion rib that extends within said recess formed in said body portion rib.

5. The guard element defined in claim 1 wherein said second surface of said body portion has first and second body portion mounting formations formed therein, and wherein said mounting portion has first and second mounting portion mounting formations formed therein, said first and second mounting portion mounting formations respectively cooperating with said first and second body portion mounting formations so as to fix said body portion in position relative to said mounting portion.

6. The guard element defined in claim 5 wherein each of said body portion mounting formations is a recess, and wherein each of said mounting portion mounting formations is a mounting portion rib, said mounting portion ribs extending respectively within said recesses.

7. The guard element defined in claim 5 wherein said second surface of said body portion has a body portion rib formed therein, and wherein said first body portion mounting formation is formed in said body portion rib.

8. The guard element defined in claim 7 wherein said first body portion mounting formation is a recess formed in said body portion rib, and wherein said first mounting portion mounting formation is a mounting portion rib that extends within said recess formed in said body portion rib.

9. The guard element defined in claim 5 wherein said second surface of said body portion has first and second body portion ribs formed therein, and wherein said first and second body portion mounting formations are respectively formed in said first and second body portion ribs.

10. The guard element defined in claim 9 wherein said first and second body portion mounting formations are recesses formed in said first and second body portion ribs, and wherein said first and second mounting portion mounting formations are mounting portion ribs that respectively extend within said recesses formed in said first and second body portion ribs.

11. The guard element defined in claim 1 further including a spacer that is connected between said body portion mounting formation formed therein and said mounting portion mounting formation.

12. The guard element defined in claim 11 wherein said body portion mounting formation is a recess, said spacer includes a rib that extends within said recess, said spacer further includes a spacer recess, and said mounting portion mounting formation is a mounting portion rib that extends within said spacer recess.

13. The guard element defined in claim 1 wherein said mounting portion has a flat surface adapted to engage the escalator side wall.

14. The guard element defined in claim 1 wherein said mounting portion has a curved surface adapted to engage the escalator side wall.

* * * * *